US010866709B2

(12) United States Patent
Chopra et al.

(10) Patent No.: US 10,866,709 B2
(45) Date of Patent: Dec. 15, 2020

(54) SYSTEM ARCHITECTURE DESIGN HAVING VISUAL ORGANIZATION OF BUSINESS FUNCTION BLOCKS

(71) Applicant: Visa International Service Association, San Francisco, CA (US)

(72) Inventors: Akshay Chopra, Dubai (AE); Matthew Dill, Singapore (SG)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 0 days.

(21) Appl. No.: 16/349,902

(22) PCT Filed: Nov. 23, 2016

(86) PCT No.: PCT/US2016/063654
§ 371 (c)(1),
(2) Date: May 14, 2019

(87) PCT Pub. No.: WO2018/097830
PCT Pub. Date: May 31, 2018

(65) Prior Publication Data
US 2019/0317651 A1    Oct. 17, 2019

Related U.S. Application Data

(63) Continuation-in-part of application No. 29/585,320, filed on Nov. 22, 2016, now Pat. No. Des. 825,941.

(51) Int. Cl.
*G06F 3/0484* (2013.01)
*G06F 3/0481* (2013.01)

(52) U.S. Cl.
CPC .......... *G06F 3/0484* (2013.01); *G06F 3/0481* (2013.01); *G06F 2203/04802* (2013.01)

(58) Field of Classification Search
CPC ................. G06F 3/0484; G06F 3/0481; G06F 2203/04802; G06F 21/629; G06F 21/6245
See application file for complete search history.

(56) References Cited

U.S. PATENT DOCUMENTS

| | | |
|---|---|---|
| 314,483 A | 3/1885 | Scarles |
| 1,567,446 A | 12/1925 | McClure |
| 3,527,004 A | 9/1970 | Sorensen |
| 3,583,466 A | 6/1971 | Dreyer |
| 3,592,288 A | 7/1971 | Walter |
| 3,908,320 A | 9/1975 | Hogue |

(Continued)

OTHER PUBLICATIONS

Notice of Allowance dated Apr. 19, 2018 for U.S. Appl. No. 29/585,320 (pp. 1-8).

(Continued)

*Primary Examiner* — Arpan P. Savla
*Assistant Examiner* — Henry Orr
(74) *Attorney, Agent, or Firm* — Loeb & Loeb LLP

(57) ABSTRACT

A visual system architecture tool uses financial system functions represented as building blocks or capability blocks. The capability blocks are placed in proximity to show elements of a particular solution to a system design requirement. The capability blocks may include detailed descriptions of the functions that are accessible graphically and may also include code modules for rapid prototyping of some or all of the system being designed.

12 Claims, 9 Drawing Sheets

(56) References Cited

U.S. PATENT DOCUMENTS

| | | |
|---|---|---|
| 4,115,937 A | 9/1978 | Wolpert |
| 4,127,196 A | 11/1978 | Boucher |
| 4,172,334 A | 10/1979 | Nielsen |
| D256,138 S | 7/1980 | Tesar |
| 4,931,783 A * | 6/1990 | Atkinson ............... G06F 3/0482 345/163 |
| D312,282 S | 11/1990 | Kelly |
| D337,834 S | 7/1993 | Kearns |
| 5,255,803 A | 10/1993 | Pavone |
| D367,972 S | 3/1996 | Valls |
| D420,223 S | 2/2000 | Valls |
| 6,206,079 B1 | 3/2001 | Selgrad |
| D455,503 S | 4/2002 | Heltzer |
| 6,442,748 B1 * | 8/2002 | Bowman-Amuah ..... G06F 8/20 717/108 |
| 6,601,233 B1 * | 7/2003 | Underwood ............. G06F 8/24 717/100 |
| 6,629,081 B1 * | 9/2003 | Cornelius ............. G06Q 20/04 705/30 |
| 6,701,996 B1 | 3/2004 | Chen |
| D500,604 S | 1/2005 | Ashby |
| D541,949 S | 5/2007 | Placuzzi |
| 7,216,305 B1 | 5/2007 | Jaeger |
| 7,654,060 B2 | 2/2010 | Steed |
| 7,870,512 B2 * | 1/2011 | Misovski ................. G06F 8/38 706/52 |
| D646,065 S | 10/2011 | White |
| 9,187,926 B2 | 11/2015 | Machacek |
| 9,271,584 B1 | 3/2016 | Weinstein |
| 9,668,592 B1 | 6/2017 | Lindblom |
| 2003/0009411 A1 * | 1/2003 | Ram ....................... G06F 40/18 705/37 |
| 2003/0058277 A1 * | 3/2003 | Bowman-Amuah ........................ G06F 16/289 715/765 |
| 2003/0197165 A1 | 10/2003 | Perelli |
| 2006/0236254 A1 * | 10/2006 | Mateescu ................. G06F 8/75 715/762 |
| 2013/0321340 A1 * | 12/2013 | Seo ...................... H04M 1/0214 345/174 |
| 2014/0157154 A1 * | 6/2014 | Brunswig ............. G06Q 10/06 715/762 |

OTHER PUBLICATIONS

International Search Report and Written Opinion for Corresponding international Applicaton PCT/CN2016/063654, dated Mar. 24, 2017, 11 pages.

* cited by examiner

SYSTEM ARCHITECTURE DESIGN HAVING VISUAL ORGANIZATION OF BUSINESS FUNCTION BLOCKS

CROSS-REFERENCE TO RELATED APPLICATION

This application claims priority to International Patent Application No. PCT/US2016/063654, filed Nov. 23, 2016, entitled "System Architecture Design Blocks," which claims priority to U.S. patent application Ser. No. 29/585,320, now U.S. Pat. No. D825,941, originally entitled "System Architecture Design Blocks", but later amended to "Display Stand for Visual Organization of Business Function Blocks", filed Nov. 22, 2016, the entire disclosures of which are hereby incorporated for all purposes.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Designing a system, particularly an end-to-end secure transaction system is difficult and complex. There are often so many elements and considerations that one person may not be able to comprehend all the requirements and possible variations and points of possible failure.

SUMMARY

Features and advantages described in this summary and the following detailed description are not all-inclusive. Many additional features and advantages will be apparent to one of ordinary skill in the art in view of the drawings, specification, and claims hereof. Additionally, other embodiments may omit one or more (or all) of the features and advantages described in this summary.

In some embodiments, an electronic simulation environment allows various secure system capabilities to be displayed in block form and grouped by function for easy recognition. The environment then allows these various capability blocks to be selected and placed according to the requirements of a particular system to visualize dependencies and connections. Each block may have additional definition and design information visually available in the form of 'turning' the block in response to an event, such as a mouse over. In an embodiment, code modules associated with each function may be assembled for rapid prototyping of test systems according to their placement.

The figures depict a preferred embodiment for purposes of illustration only. One skilled in the art may readily recognize from the following discussion that alternative embodiments of the structures and methods illustrated herein may be employed without departing from the principles described herein.

DETAILED DESCRIPTION

Figure 1:
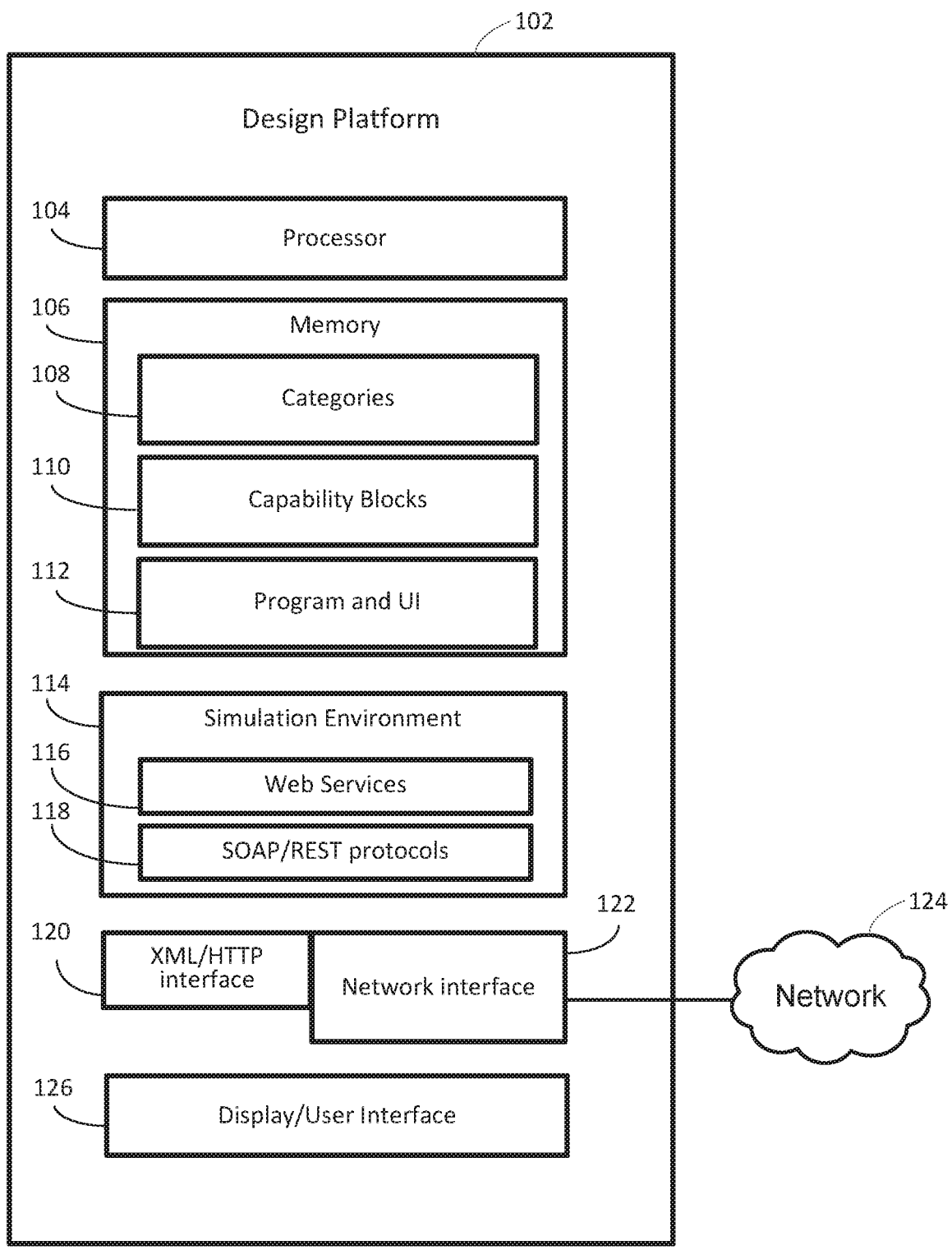
FIG. 1 illustrates a block diagram of system supporting system architecture design blocks in accordance with the current disclosure.

FIG. 1 generally illustrates one embodiment of a design platform 102 that supports system architecture design blocks. The design platform 102 may include a processor 104 and memory 106. The memory 106 may store both data and executable code. For example, the memory may store category information 108 related to various financial and service functions available for use in the design process. The memory 106 may also include specific capability block data 110 that, in an embodiment, may be sorted according to the categories 108. The categories and specific capability blocks are discussed in more detail below. Executable data stored in the memory 106 may include program and user interface executable code 112 used to implement the design process. The design platform 102 may also include other executable code that supports an operating system and various utilities including boot programs (not depicted).

The design platform 102 may also include a simulation environment 114 used to support rapid prototypes built using one embodiment of the capability blocks. The simulation environment 114 may include web services 116 that provide a framework for interaction with web services made available by the various capability blocks 110. Similarly, Simple Object Access Protocol (SOAP) or Representational State Transfer (REST) protocols facilitate data transfer between capability blocks, as described in more detail below.

A protocol interface 120 supporting, for example, XML and HTTP communication over a network interface 122 may be part of the design platform 102 and may support communication with an external communication network 124. In one embodiment, the design platform 102 may be implemented in a distributed fashion using a client/server model. In this embodiment, user interface functions and some programmatic services may be supported in a browser of a first computer with executable code and protocol support provided at a server separate from the first computer.

A user interface 126 may include a display, which itself may include a touchscreen input, a keyboard, a cursor controller, such as a mouse, or other known user interface elements used to interact with a human user.

Figure 2:
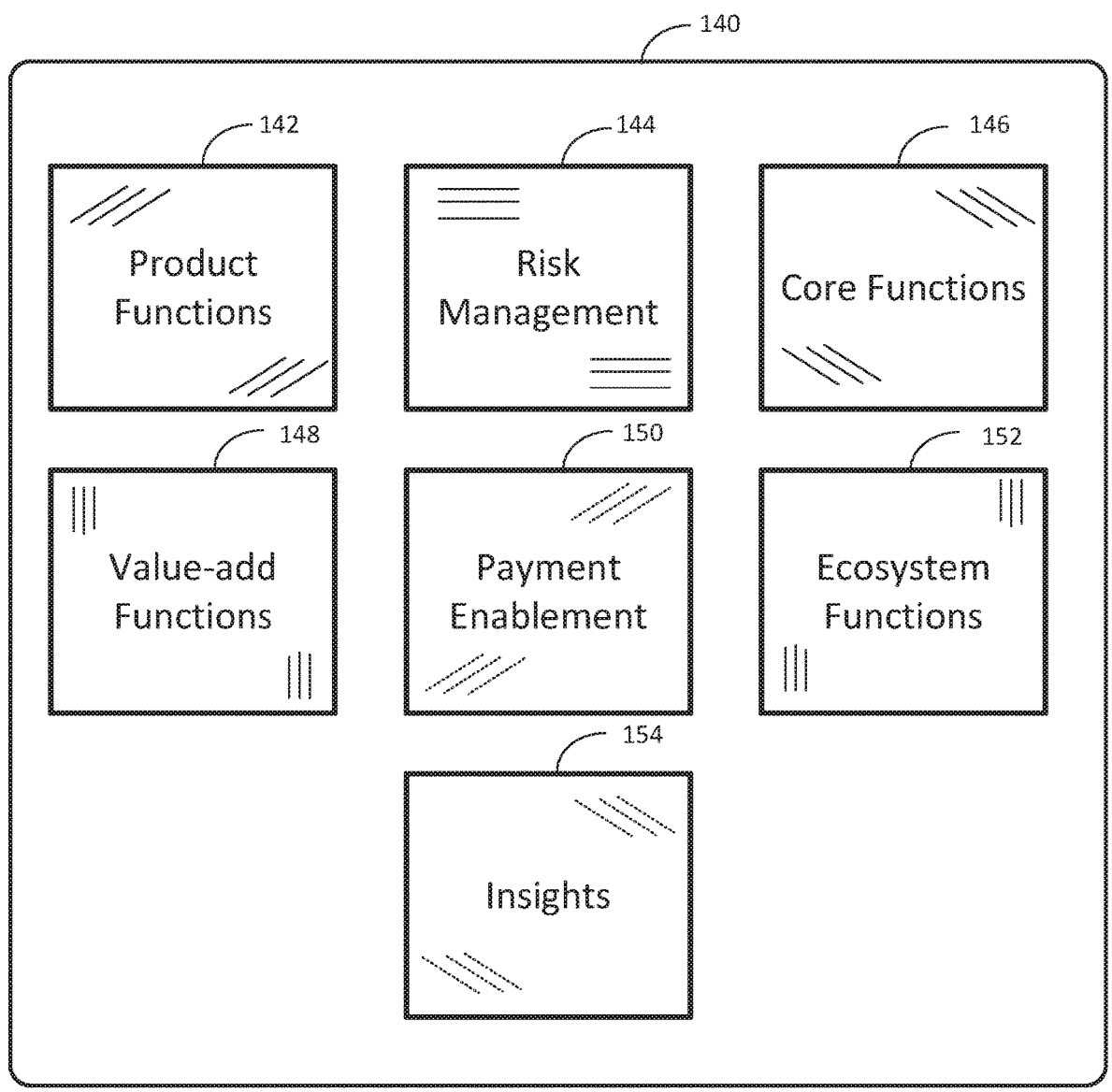
FIG. 2 is an illustration of a simulated display showing system categories.

FIG. 2 illustrates a simulated screen 200 of the user interface 140 showing a variety of categories that represent various architectural functions available for use in a design. These categories may include, but are not limited to, product functions 142, risk management 144, core functions 146, value-added functions 148, payment enablement 150, ecosystem functions 152, and insights 154. Each of these categories will be discussed in more detail below. In various embodiments, each of the categories may be uniquely identified by coloring or shading and may be illustrated by the surface shading in FIG. 2.

Figure 3:
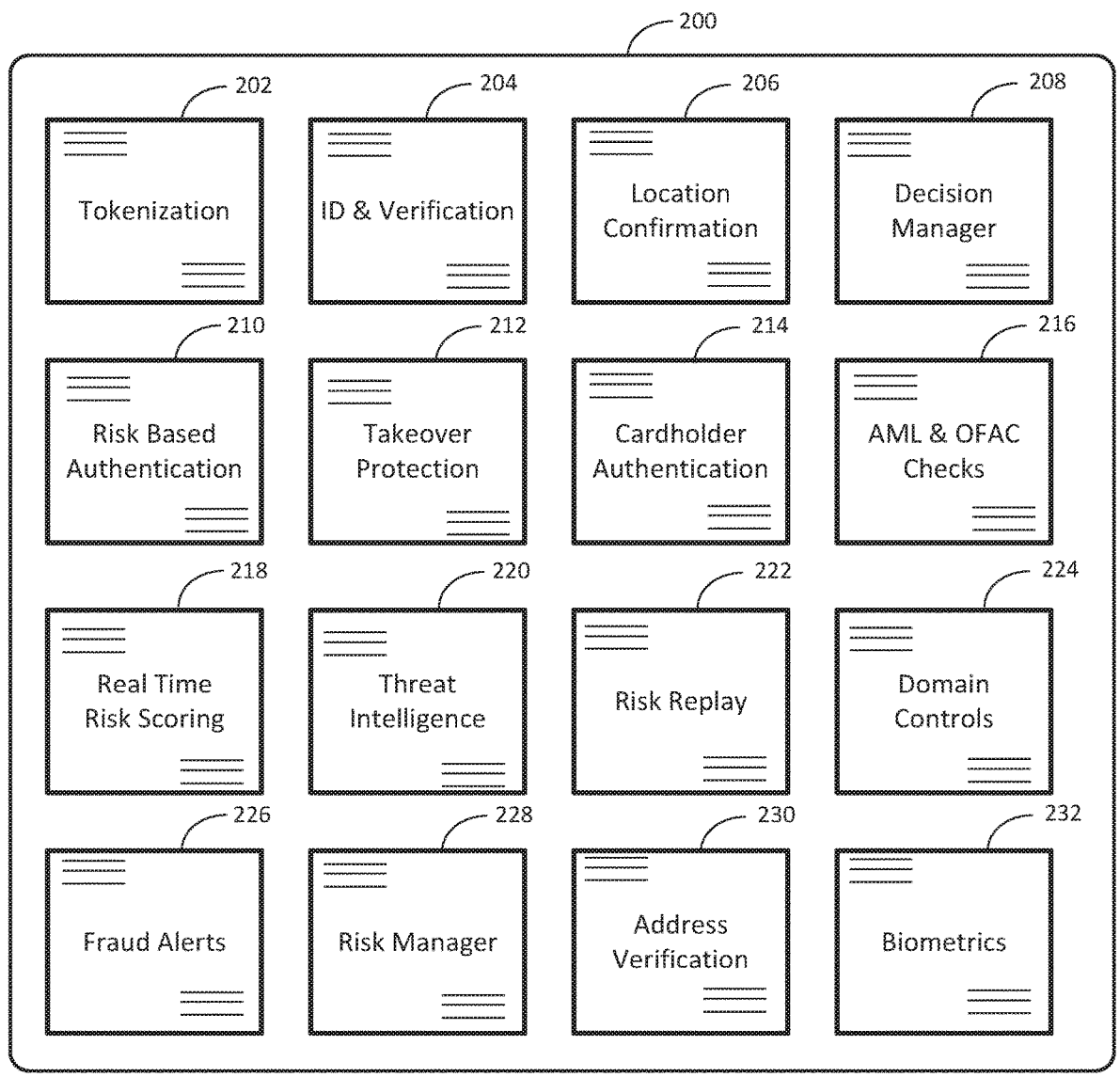
FIG. 3 is an illustration of a simulated display showing capability blocks for a selected system category.

A portion 200 of the user interface 126 is illustrated in FIG. 3, showing capabilities available in the risk management category. Each of the capability blocks illustrated has the same color, or in the case of FIG. 3, the same surface shading as the parent category representation of FIG. 2. While the risk management category 144 is illustrated in FIG. 3, a description of representative capabilities available for the remaining illustrative categories follows the description of FIG. 3. In various embodiments, every capability block from every category may be available on the portion 200 of the user interface 126, for example using a scrolling window. In such an embodiment, the color or surface shading may be used to help identify capability blocks associated in the same category.

Risk Management

Risk Management 144 may be directed to the broad concept of reducing danger or points of weakness in a secure network. In one embodiment, risk management may be directed to preventing theft of funds or identity and securing both financial information and transaction data. Capabilities represented by individual capability blocks in risk management area may include, but are not limited to, the following representative capabilities.

Tokenization 202: May replace sensitive data such as card data with a secure token such as a token from a trusted party. Tokens may provide a domain-restricted digital credential for use in devices, apps, cloud services and more.

ID & Verification 204: May combine network risk scores with additional data such as bank data, purchase history, device ID, and biometrics to register customers and reduce downstream service risks.

Location Confirmation 206: May establish a network party's location location such as a cardholders location, via mobile device to validate overseas transactions, reduce declines or offer services.

Decision Manager 208: May include data sources which analyze big data into real-time approval decisions to keep businesses moving and reduce fraud.

Risk Based Authentication 210: May provide a multi-domain, multi-factor security capability, such as three domain secure (3DS), to help prevent the fraudulent use of branded cards online.

Takeover Protection 212: May defend network participants, such as cardholders and merchants, from fraudulent use of online accounts by identifying suspicious actors and monitoring account changes.

Cardholder Authentication 214: May authenticate cardholders through a secure network, such as VisaNet, at enrollment and during purchase transactions with a comprehensive set of tools.

AML & OFAC Checks 216: May leverage brand tools and government watchlists to identify suspicious behaviors and provide risk scoring on payors and payees.

Real Time Risk Scoring 218: May allow the network to analyze big data to provide advanced fraud screening and transaction scoring in real-time.

Threat Intelligence 220: May include threat intelligence which may help banks and retailers prioritize what threats to act upon, how to act, and may provides actionable tools.

Risk Replay 222: May allow 'replay of risk' decisions using historical transaction data to create 'what-if' modeling scenarios.

Domain Controls 224: May provision a token and cryptogram tied to a mobile device, payment application or service category and eliminate out of band usage.

Fraud Alerts 226: May inform cardholders directly via SMS, messaging service, email or other out-of-band networks when unusual or high value transactions occur.

Risk Manager 228: May enhance decisioning capability with custom rules in Risk Manager or benchmark decisions against brand scores.

Address Verification 230: May confirm a customer's billing address or mail codes with stored records to reduce fraud and use of lost/stolen cards.

Biometrics 232: May identify or authenticate a user identity using biological identifiers (e.g. fingerprint, iris or palm scanners and facial recognition).

Core Functions

Core functions 146 may be those functions that are fundamental to to a network such as a financial processing network.

Credit Card: May provide consumers the ability to "pay later" for goods or services wherever brand is accepted with a personalized credit facility.

Debit Card: May provide consumers the ability to "pay now" for goods or services wherever brand is accepted by linking to a current account.

Co-Brand Card Custom: May include credit or debit program offering special points or rewards from a leading consumer brand.

Prepaid Card: May provide consumers the ability to "pay in advance" for goods or services wherever the brand is accepted by loading a prepaid account.

Private Label Card: May leverage network to build a custom branded payment solution accepted at participating locations.

Gift Card: May include a card pre-loaded with funds that can be gifted to others for use across the brand network or at a single merchant.

Proximity Acceptance: May include physical acceptance performed at the retail POS by swiping, dipping, tapping or streaming.

020 Acceptance: May include purchase experiences which begin remotely and may end in proximity (e.g., order ahead, taxi service, delivery services).

Remote Acceptance: May include eCommerce or Mobile acceptance performed end to end in a digital environment through card entry, card on file, subscription or pay button.

Product Packages

Product packages 142 may include higher level functions and utilities that facilitate end-to-end connectivity and security in transaction processing.

Verified Transactions: May increase security of online card use using three domain secure (3DS) protocol and Cardholder Authentication System.

Checkout: May allow virtual wallets such as Visa Checkout to store card information securely and streamlines the payment experience for consumers and merchants.

Transaction processing: May include a service which consolidates acceptance of card-based payments and alternative payments options for online or in-app services.

Direct processing: May allow exchange value card-to-card or service provider-to-card over network. Applications include P2P, bill pay, funds transfer, etc.

Communications Network: May include an integrated network of retailers, financial institutions, offers, rewards and loyalty programs.

Developer: May include a unified set of application program interfaces and software design kits providing partners and developers with a testing sandbox and powerful tools for commerce.

Mobile support: May include a mobile-first payment and acceptance structure which extends retail acceptance Token Service: May include token vault and provisioning system integrated into network and connected to issuers, processors and third party platform providers.

Payment gateway: May describe an API based payment gateway that enables digital merchants and developers to accept online payments easily and securely.

Value-Add Services

Value-add services 148 may include services that enhance the user experience or extend the capabilities of secure network processing architecture, such as a financial network, beyond simple point-of-sale card processing.

Fast Funds: May allow issuers to configure Fast Funds to enable near-instant funds transfer to recipient account, as opposed to 2 days standard transfer which may be useful for push payments.

Card on File: May store account details such as card details securely to simplify repeat purchases and/or enable aggregation, recurring or subscription services.

Aggregation: May accumulate small card payments up to approved limits or time thresholds to simplify shopping or billing experience (e.g. music).

Micropayment: May identify transactions by merchant, type and value to establish special categorization for low value transaction types.

Points: May link a card or profile and allow consumers to accumulate and redeem points to drive loyalty or purchase behaviors.

Recurring Payments: May include estanding instructions that allow customers to make card payments at regular intervals (e.g. bills, subscriptions).

Transaction Alerts: May connect customers with purchases in real time through Network Alerts. Card purchases may be passed to connected apps or devices.

Card Controls: May help consumers personalize card permissions through processor systems using limit, threshold, location or channel data.

FX Rate Check: May allow easy access to daily currency conversion rates. Simplify user experience for cross-border transactions.

Real Time Redemption: May offer redemption at the POS. Purchase amount reduced in real time as part of the authorization and consumers notified via receipt or SMS or other out-of-band communication.

Digital Receipt: May include network Alerts which may be formatted as rich consumer receipts and delivered electronically via text or email.

Instant Issue: May include real-time digital issuance of a new, purchase ready card in-app or online. Instant Issue may seamlessly connect consumers and card products in the digital environments where they shop and play.

Loyalty: May allow merchants and issuers to create custom loyalty and rewards programs that are linked to Visa cards.

Real Time Offers: May offer discounts to cardholders to drive purchase activity with real-time analytics, targeted discounts and support for third-party offer programs.

Transaction History: May publish and update transaction history in real time to a website or mobile app. API allows permission based configurations.

Sourced Offers: May display offers sourced on a partner website or mobile app and may provide incentive for activation or usage.

Card Link: May link value to card usage. Whenever an electronic event such as a Visa purchase event occurs, it may trigger offers, loyalty, alerts or other third party services.

Account Updater: May automatically update expiring/renewed cards without requiring users to enter information. May also reduce service interruptions or abandonment.

Location-Based Alerts: May tie mobile apps to Visa's geo-location offering and provide cardholders seamless service, related offers, fraud protection, etc.

Travel Notifier: May be a tool for network users such as cardholder to inform bank about overseas travel plans via app or online which may helps reduce overseas declines and enables offers.

Payments Enablement

Payments Enablement 150 may be functions that support the physical act of performing a transaction.

Swipe: May include Magnetic Stripe Technology activated during purchase by swiping the reader of a merchant POS machine.

Dip: May include EMV Chip technology activated during purchase through chip on chip contact with a merchant POS machine.

Click: May include frictionless "click to buy" efficiency online or in mobile device using a selection of service offerings.

Tap: May include using NFC to provide a secure tap to pay experience at millions of retail locations worldwide from card, wearable or mobile device.

Stream: May stream low energy Bluetooth (BLE) or sound waves tied to a merchant location or purchase activity to initiate a payment or pass payment credentials.

Fund: May include Account Funding Transaction (AFT) that may pull funds from sender's account, in preparation for pushing funds to a recipient's account.

Scan: May include a acan or Barcode tied to a merchant location or purchase activity to initiate a payment or pass payment credentials.

Push: May exchange value card-to-card or service provider-to-card include P2P, bill pay, funds transfer, etc.

Ecosystem Functions

Ecosystem functions 152 may be electronic functions which may connect a transaction or financial process with the external world, such as social media, location services, smart phone operability and more.

Beacons/Sensors: May include low-cost hardware devices that establish events (e.g. in proximity) or transmit messages that can be acted upon by applications.

Geolocation Services: May include mapping technology coupled with application intelligence to identify people or events to enhance and/or deliver services (e.g. offers, fraud, etc.).

Mapping Services: May include specialized map providers enabling other businesses to integrate/overlay service offerings via APIs.

Data Visualizers: May include tools that enable the simplified graphic display of diverse data types. May be integrated into apps or webpages via APIs.

Messaging Platforms: May include messaging platforms that enable individual or group based communication and have become a powerful platform for related services through API/SDK.

Social Media Platforms: May include Social Media platforms that enable community based publishing, sharing and commenting features and have become a powerful platform for related services through API/SDK.

QR Code/Reader: May include QR code (or bar code) which may be converted from machine readable format to text or data format.

Smart OS: May include integration with proprietary operating system for mobile devices and other connected devices (e.g. Cars, TV, wearables).

Blockchain: May include a distributed database that maintains a continuously growing list of data records hardened against tampering and revision with timestamping and cryptography.

Internet of Things (IoT): May describe a network of objects, devices, vehicles, buildings etc. that connect, collect and exchange data through the cloud with embedded technology and sensors.

Insights

Insights 154 may help make actionable business decisions based on analysis of thousands, if not millions, of individual transactions so that a business can better serve its customers.

Pricing Analytics: May drive market studies and initiate limited trials to optimize pricing for new product or service categories.

Data & Analytics: May receive insight from transaction data, ranging from simple batch data to dashboards or bespoke analytics programs.

Cardholder Analytics: May use transaction data to understand consumer purchase trends and encourage or reward purchase activity.

Retail Analytics: May use retail transaction data to understand purchase trends, benchmark among peers or acceptance locations, and encourage purchases.

Cardholder Segmentation: May use data and market insights to segment cardholders into behavioral clusters and build product offerings.

Figure 4:
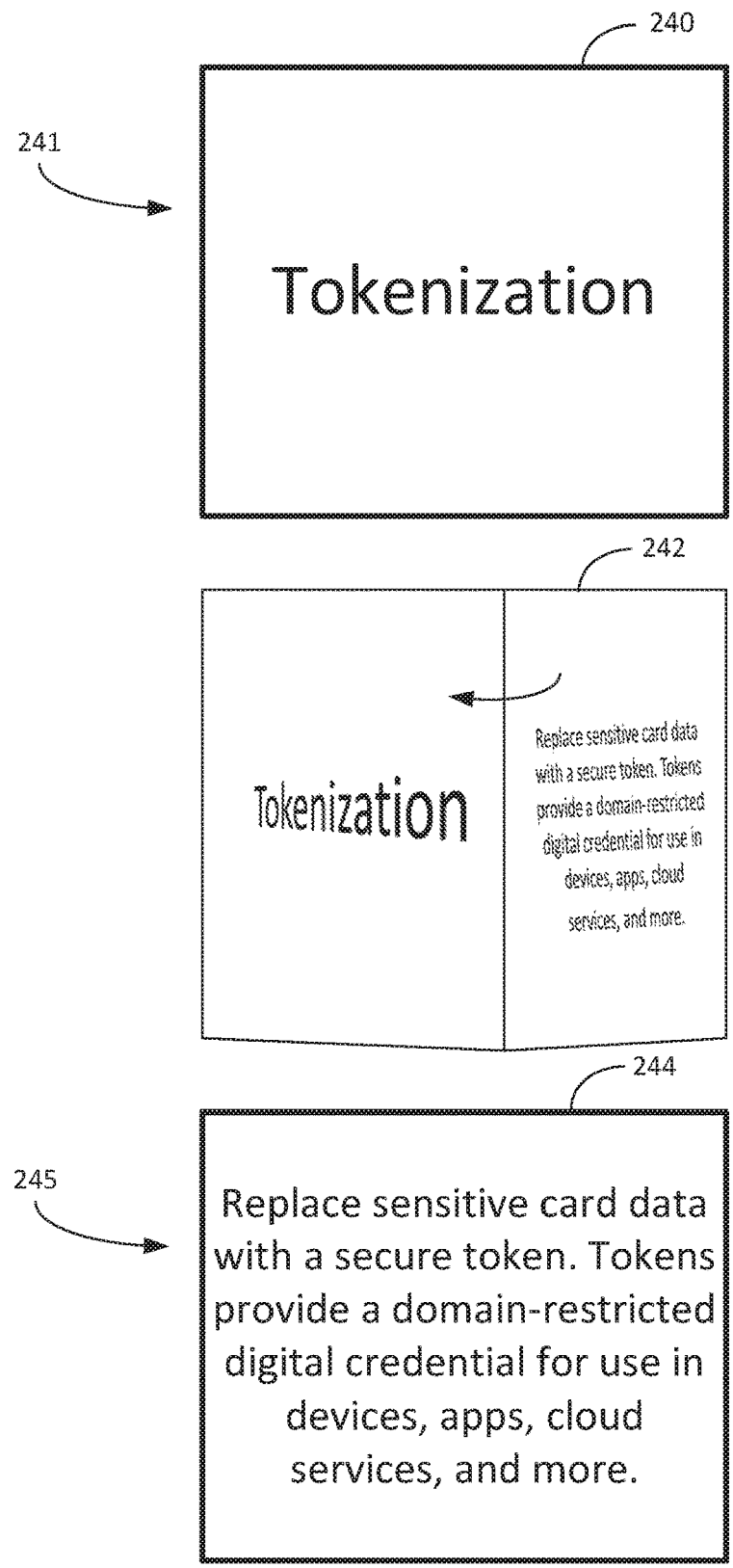
FIG. 4 illustrates animation of a selected capability block responsive to a user interface event.

FIG. 4 is a graphical illustration of a characteristic of a capability block, in this illustration, the capability block 240 representing tokenization is shown in a title view 241. In response to a user interface event, such as a mouse over, the block may rotate as illustrated by partially turned capability block 242 to reveal a descriptive view 245 of the function as illustrated in rotated block 244. In an embodiment, each of the capability blocks described for any function in any category may have the ability to change its displayed shape in order to a descriptive view 245 about that particular capability block. This action is different from a "tool tip" that pops up over an object when a mouse hovers over the object, as found in some word processing or drawing applications.

Figure 5:
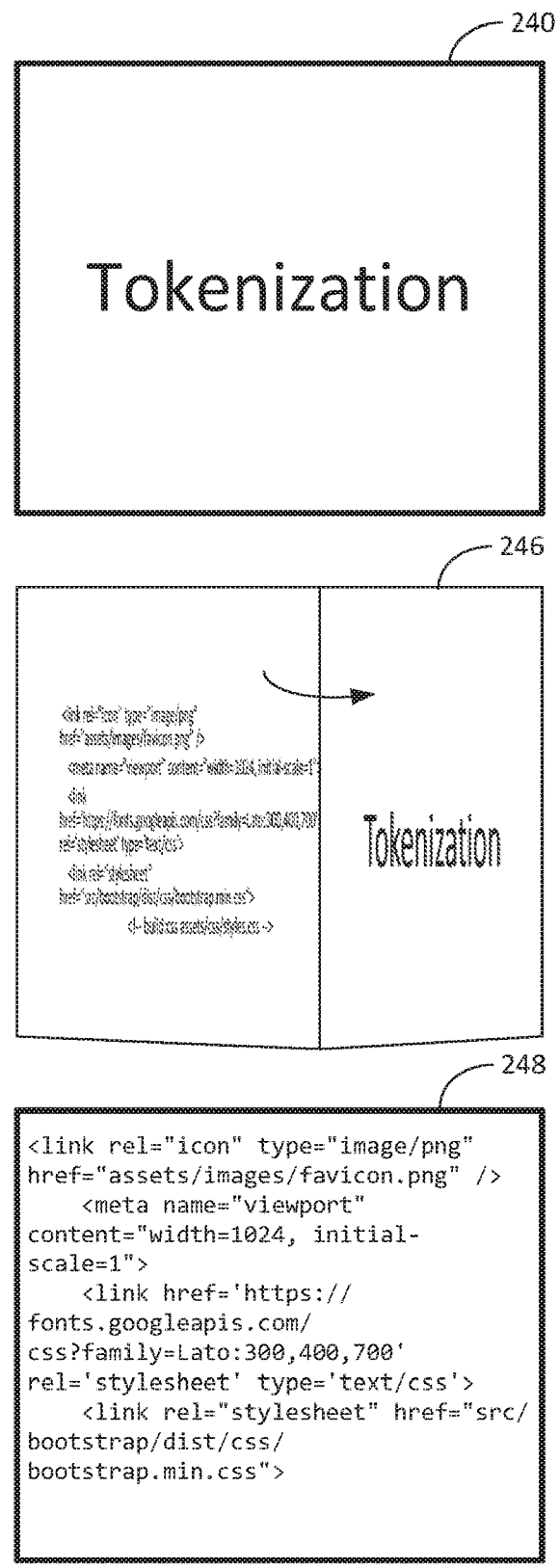
FIG. 5 illustrates another aspect of animation of the selected capability block of FIG. 4 responsive to a different user interface event.

As illustrated in FIG. 5, similar to the rotation illustrated in FIG. 4, another user interface event, such as a shift-mouse over event, may cause the capability block 242 rotate in opposite direction, as illustrated by partially rotated block 246, to reveal representative executable code associated with that function as shown at block 248.

Figure 6:
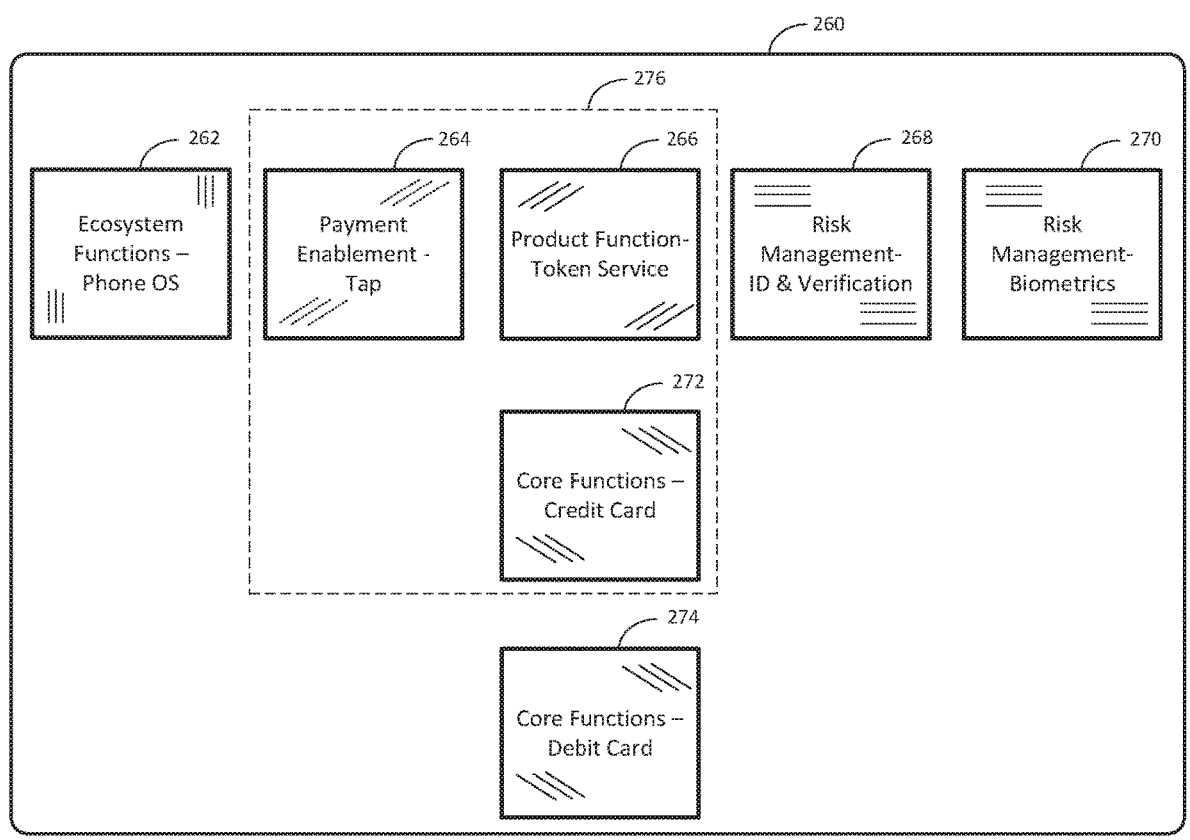
FIG. 6 is an illustration of a simulated display showing a representative system architecture using capability blocks.

FIG. 6 illustrates a sample architecture 260 which may be shown on a second portion 261 of a user interface 126 illustrating how blocks may be added sequentially or by drag-and-drop to visualize both the capabilities required to implement a solution and how the various capabilities fit together in the course of transaction. The sample architecture 260 of FIG. 5 shows how a smartphone enabled payment system may be architected. A smartphone OS 262 may be taken from the Ecosystem category 152 and coupled to a payment enablement capability 150, specifically, a tap function 264, defining that the smartphone OS 262 may utilize near-field communication (NFC) for this proposed solution. A token service 266 selected from the product function category 142 may be used to add security to transactions by replacing a personal account number (PAN) with a token. The token service 266 may interact with core functions 146 such as credit 272 and debit 274 functions to allow use of both of those payment vehicles in the token service environment. Part of the transaction process, as illustrated, is an Identification (ID) and Verification capability 268 selected from the risk management category 144. An extension of the ID and Verification capability 268 is biometrics 270, also from the risk management category 144. In an embodiment, the biometrics 270 may take advantage of the ecosystem functions of the smart phone available through the smartphone OS capability 262.

While every capability does not lend itself to rapid prototyping, for example, a private label card capability, many of the capability blocks have specific functions with defined inputs and outputs that can be modeled and simulated. To illustrate, a sub-function 276 is discussed in more detail in FIG. 7.

Figure 7:
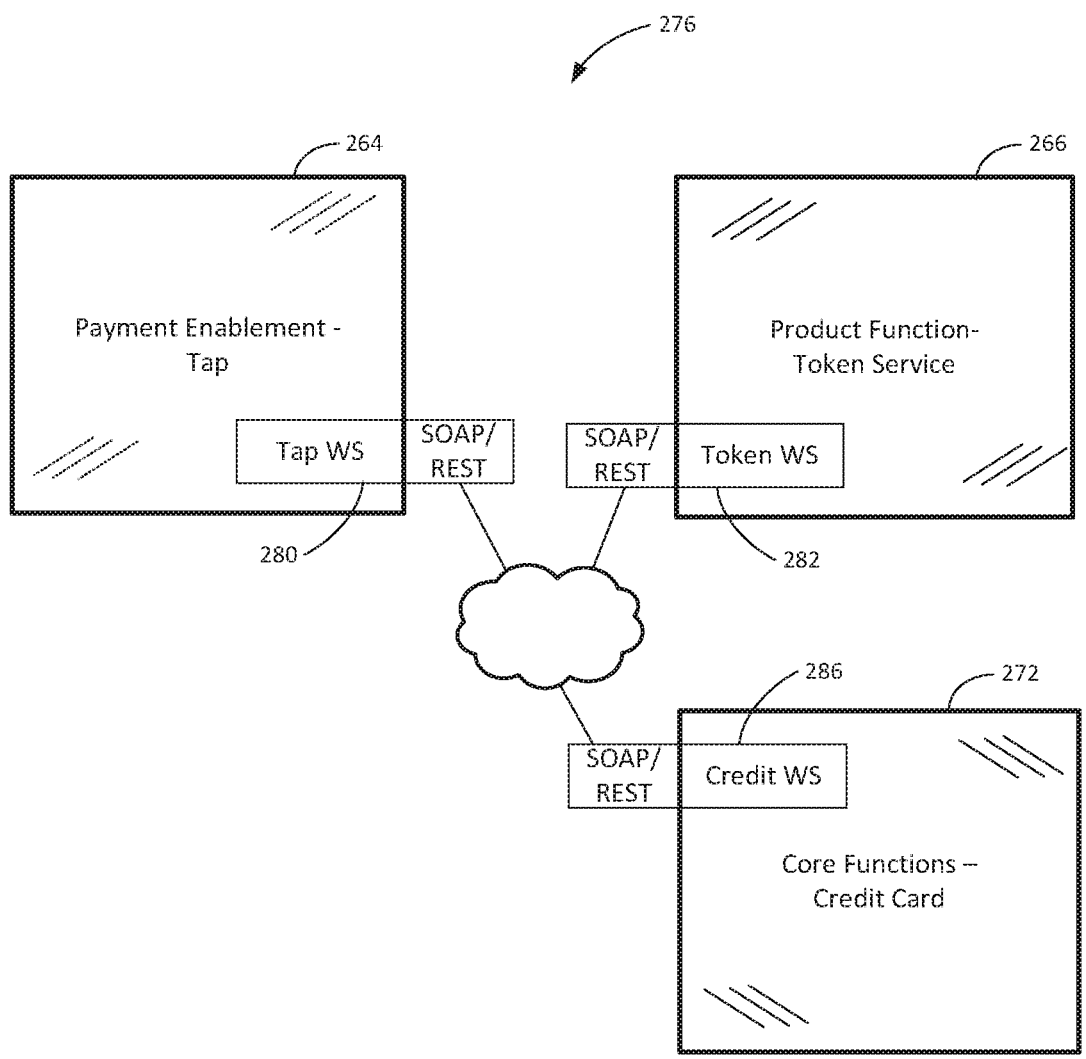
FIG. 7 illustrates a detailed view of aspects of selected capability blocks shown in FIG. 6.

As shown in FIG. 7, each capability block 264, 266, 272 may include a respective web service (WS) code module 280, 282, 284 including an appropriate interface to publish and request services. In various embodiments, SOAP or REST protocols may be used to publish the services that are made available by a particular capability block so that the simulation environment 114 can manage data transfers between the various connected blocks. For example, as illustrated in FIG. 7, the tap function may respond to a start of simulation command by returning a token and transaction details representing a customer tap at an NFC point of sale terminal. The token and transaction details may be transferred by the simulation environment 114 to the adjacent block, the token service capability block 266. The token service web services module 282 may simulate the token service role in a transaction by de-tokenizing and interacting with the credit web services module 286 to generate transaction approval or denials based, in part, on other downstream services, such as ID and verification capability block 268, which is not depicted in FIG. 7.

Under the control of the simulation environment 114, different scenarios may be rapidly simulated by moving appropriate blocks to create connections. In some cases, graphical connectors may be used to simulate conditional data flows, branches, or other functions that are not necessarily performed in sequence, such as evaluating data with functions from the Insights category 154. The results of a simulation may be in the form of "data on the wire," that is, the contents of the data flowing between blocks, including input data and output data. While the simulation provides valuable insights, an even more powerful extension of the system architecture design blocks is a fully configurable system that requires only verification of the external connection protocols and data formats to be able to build a production system using this concept.

Figure 8:
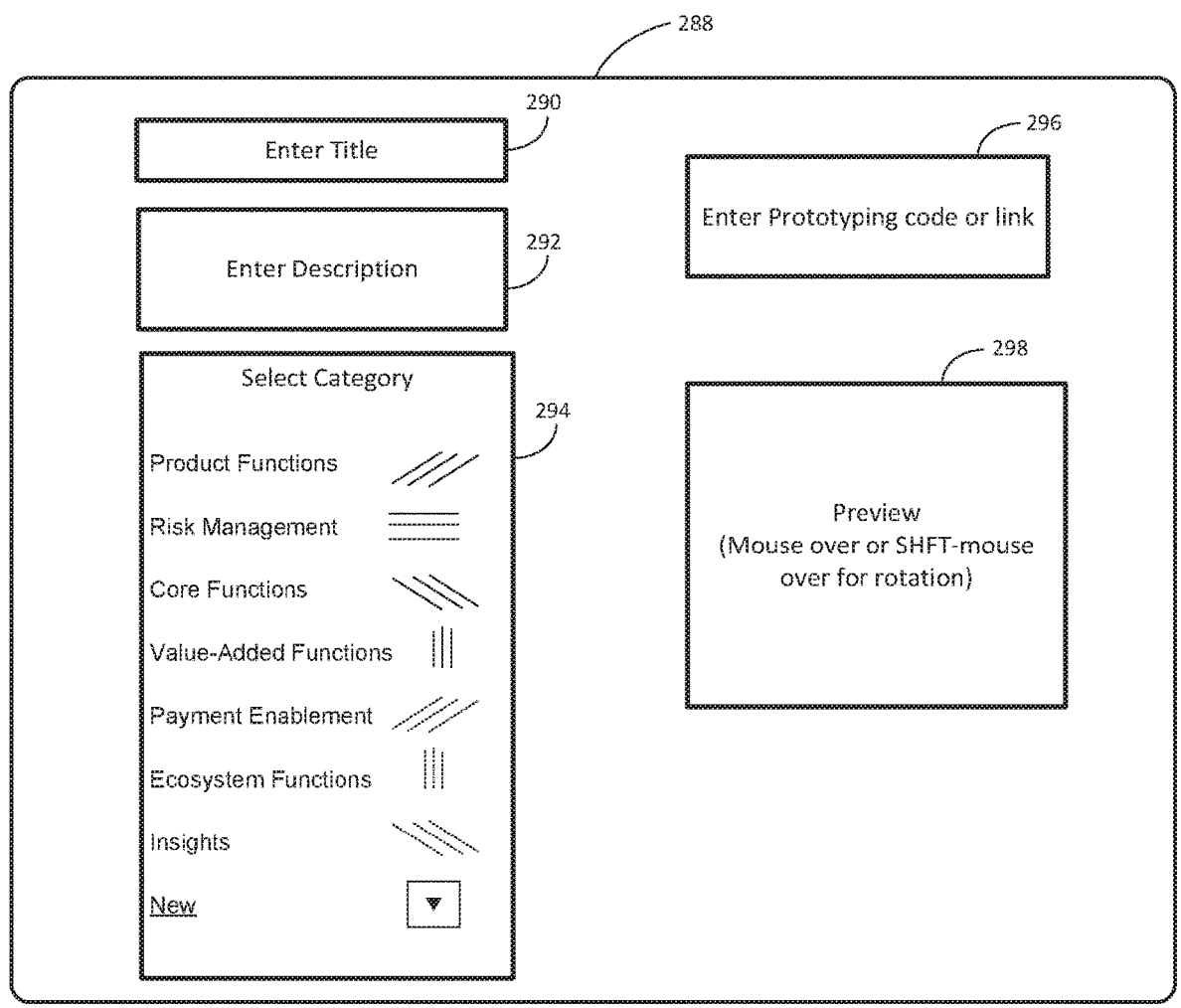
FIG. 8 illustrates an exemplary display for creating a capability block.

FIG. 8 is a simulation of a user interface 288 illustrating an administrative screen for creation of new blocks as new capabilities become available. In the simulation there are text entry areas such as input area 294 entering a title and an input area 292 for entering a description. The description may include a brief definition of the features and functions of the capability block being created, such as those listed above. Input area 294 may be used to select a category with which to associate the newly created capability block. And ability to create a new category may also be provided with in the select category input area 294. Input area 296 may be used to paste in prototyping code used in rapid prototyping of systems using the newly created capability block. In another embodiment, a simple link to a code repository may be used to associate the prototyping code with this block. Finally, a preview area 298 may allow real time viewing of the capability block as it is being created. For example, as the title is entered at input area 290, the title may appear in the preview area 298. Similarly as description and prototyping code are available the preview area 298 may accommodate animations as described above to show the description and/or the prototyping code or link.

Figure 9:
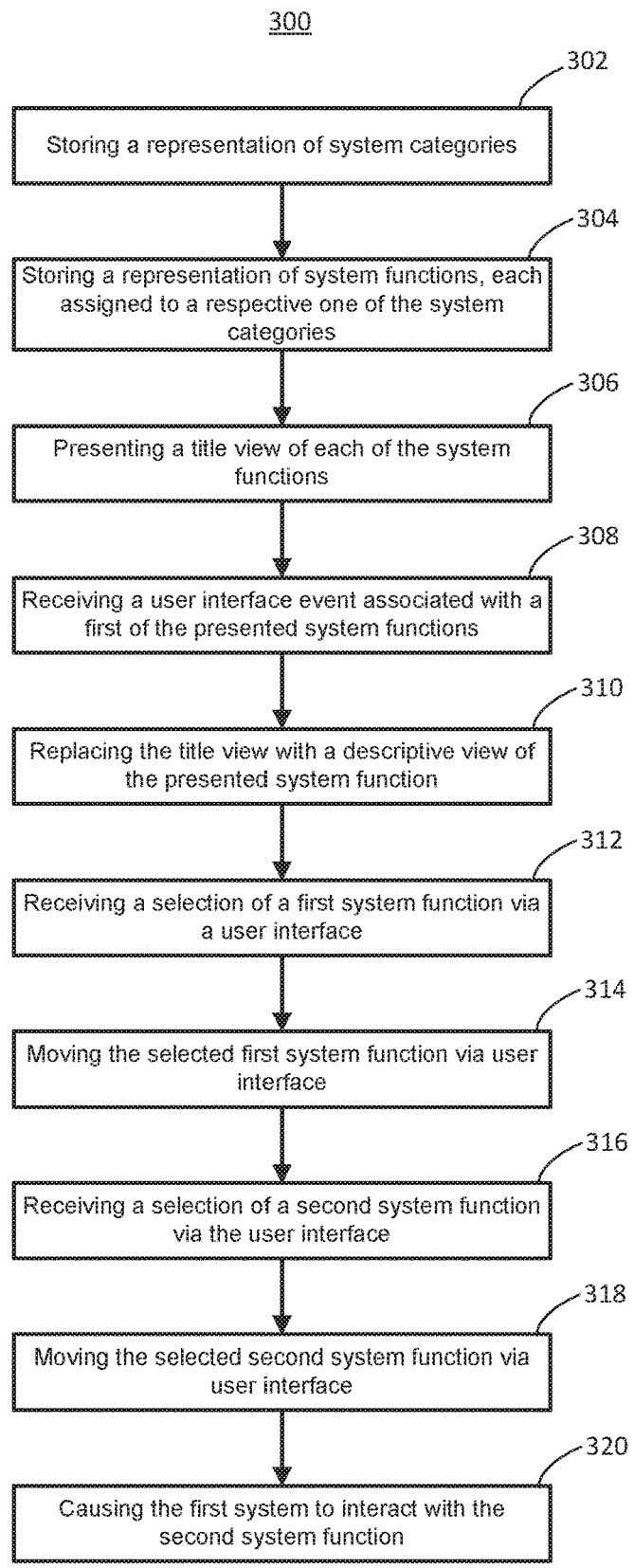
FIG. 9 illustrates an exemplary process flow for using system architecture design blocks.

FIG. 9 illustrates a method 300 of modeling a system, more particularly, a financial system. At block 302, a representation of system categories 142-154 is stored in a memory 106 of a design platform 102. The representation may include a title, descriptive data, and color or shading information used to distinguish the categories when displayed.

Block 304 shows a representation of each of a plurality of capability blocks may be stored at the design platform 102. Capability blocks may sometimes be referred to as system functions due to the nature of what each capability block represents. Each capability block may be assigned to a respective one of the system categories. The representations for each of the plurality of capability blocks may include a title, a description, a code module used for simulation of the represented function, and a color or shading that associates a capability block with its respective system category.

At block 306, a title view 241 of one or more of the capability blocks may be presented via a first portion 200 of a user interface 126. A user interface event associated with a first of the presented capability blocks may be received at block 308. In an embodiment, the user interface event may be a mouse over event. In other embodiments, the user interface event may be selection of the first of the presented capability blocks via mouse click or screen tap.

The title view 241 may be replaced, at block 310, with a descriptive view 245 of the first of the presented capability blocks. The descriptive view may be maintained until the user interface event is cleared, such as by moving a screen cursor off of the first of the presented screen functions. At block 312, a selection of a first capability block may be received via the user interface 126 and at block 314, the selected first capability block may be moved to a first location on a second portion 260 of the user interface 126 responsive to a user interface command. Blocks 316 and 318 may cause the selection and movement of a second capability block to the second portion 260 of the user interface 126. For example, referring to FIG. 6, this process may be used to select and place capability blocks 264 and 266 on the second portion of the display 260. As illustrated, this process of selecting and placing capability blocks may be repeated as many times as necessary to capture the system architecture of a proposed transaction processing or related financial system.

At block 320, the first capability block 262 may be caused to interact with the second capability block using a first code module 280 associated with the first capability block 264 and a second code module 282 associated with the second capability block 266. As discussed above, the interaction may be in the form of a simulation of the functions and data transfers performed by and between the capability blocks or system functions represented in a particular architecture.

The system and method discussed above are applicable to system architecture and design projects and solve the problem of generating rapid prototypes or simulations of financial systems using basic functional blocks and associated code modules. The use of this technique essentially generates code according to the relational placement of the capability block and its associated function allowing business-driven system architectures to be designed and tested virtually in real time.

The methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "an embodiment" or "teaching" means that a particular element, feature, structure, or characteristic described in connection with the embodiment is included in at least one embodiment. The appearances of the phrase "in some embodiments" or "teachings" in various places in the specification are not necessarily all referring to the same embodiment.

Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. A system for visualizing a system architecture comprising:
   a memory that stores executable instructions;
   a user interface including a display and a data entry apparatus;
   a processor that executes the executable instructions, the executable instructions including code that cause the system to:
      store, via a database, for each of a plurality of capability blocks, a functional category, a function title, a financial function description, and representative executable code associated with a financial system function, wherein each of the plurality of capability blocks has a plurality of sides, wherein the function title is associated with a first side of each of the plurality of capability blocks, the financial function description is associated with a second side of the plurality of capability blocks, and the representative executable code is associated with a third side of each of the plurality of capability blocks, and wherein the second side is adjacent the first side and the third side is adjacent the first side;
      display, at a first portion of the display, the plurality of capability blocks, each of the plurality of capability blocks representing a financial system function;
      receive selection of one of the plurality of capability blocks;
      receive an indication of a location for placement of the selected one of the plurality of capability blocks on a second portion of the display;
      adjust the display to place the selected capability block at the indicated location of the second portion of the display;
      receive a user interface event corresponding to one of the plurality of capability blocks; and
      responsive to receiving the user interface event, rotate the corresponding one of the plurality of capability blocks to present descriptive data about the one capability block, wherein the descriptive data is one of the function title, the financial function description, and the representative executable code.

2. The system of claim 1, wherein the corresponding one of the plurality of capability blocks is rotated to reveal the function title, the financial function description, or the representative executable code.

3. The system of claim 1, wherein the second side is opposite the third side.

4. The system of claim 1, wherein the corresponding one of the plurality of capability blocks is rotated in a first direction to reveal the financial function description and rotated in a second direction to reveal the representative executable code.

5. The system of claim 1, wherein each of the plurality of capability blocks is characterized for its respective functional category by one of shape or color.

6. The system of claim 5, wherein the categories are selected from the set comprising: product functions, risk management, core functions, value-add functions, payment enablement, ecosystem functions, and insight functions.

7. The system of claim 1, further comprising code to cause the system to store, via the database, for each of the plurality of capability blocks, a software code module that performs a function according to the respective financial system function.

8. The system of claim 7, further comprising instantiating the respective software code module for each of the plurality of capability blocks that is represented in the second portion of the display.

9. The system of claim 8, wherein the instantiated software code modules communicate with each other via a web services protocol to emulate the respective functions of the capability blocks represented in the second portion of the display.

10. The system of claim 7, wherein the descriptive data is one of the function title, the financial function description, and representative executable code for the software code module.

11. The system of claim 10, wherein the corresponding one of the plurality of capability blocks is rotated in a first direction to reveal the financial function description and rotated in a second direction to reveal the representative executable code.

12. A method for modeling a system architecture comprising the steps of:
    storing, via a database, for each of a plurality of capability blocks, a functional category, a function title, a financial function description, and representative executable code associated with a financial system function, wherein each of the plurality of capability blocks has a plurality of sides, wherein the function title is associated with a first side of each of the plurality of capability blocks, the financial function description is associated with a second side of the plurality of capability blocks, and the representative executable code is associated with a third side of each of the plurality of capability blocks, and wherein the second side is adjacent the first side and the third side is adjacent the first side;
    displaying, at a first portion of a display, the plurality of capability blocks, each of the plurality of capability blocks representing a financial system function;
    receiving a selection of one of the plurality of capability blocks;
    receiving an indication of a location for placement of the selected one of the plurality of capability blocks on a second portion of the display;
    adjusting the display to place the selected capability block at the indicated location of the second portion of the display;
    receiving a user interface event corresponding to one of the plurality of capability blocks; and
    responsive to receiving the user interface event, rotating the corresponding one of the plurality of capability blocks to present descriptive data about the one capability block, wherein the descriptive data is one of the function title, the financial function description, and the representative executable code.

* * * * *